United States Patent
Cho et al.

(10) Patent No.: US 10,623,826 B2
(45) Date of Patent: *Apr. 14, 2020

(54) ADVERTISEMENT DETECTION SYSTEM AND METHOD BASED ON FINGERPRINTS

(71) Applicant: Enswers Co., Ltd., Seoul (KR)

(72) Inventors: Hoon-Young Cho, Seongnam (KR); Jaehyung Lee, Seoul (KR)

(73) Assignee: Enswers Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/360,453

(22) Filed: Mar. 21, 2019

(65) Prior Publication Data

US 2019/0222907 A1 Jul. 18, 2019

Related U.S. Application Data

(63) Continuation of application No. 16/133,240, filed on Sep. 17, 2018, now Pat. No. 10,284,922, which is a
(Continued)

(30) Foreign Application Priority Data

Jun. 14, 2013 (KR) .................. 10-2013-0068305

(51) Int. Cl.
*G06K 9/00* (2006.01)
*H04N 21/81* (2011.01)
(Continued)

(52) U.S. Cl.
CPC ....... *H04N 21/812* (2013.01); *G06K 9/00718* (2013.01); *H04H 60/375* (2013.01);
(Continued)

(58) Field of Classification Search
None
See application file for complete search history.

(56) References Cited

U.S. PATENT DOCUMENTS 8,594,392 B2 * 11/2013 Bilobrov ............ G06K 9/00711
382/124
8,713,068 B2 * 4/2014 Seet ........................ G06F 16/41
707/802
(Continued)

FOREIGN PATENT DOCUMENTS

GB 2460844 12/2009
GB 2485694 5/2012
(Continued)

OTHER PUBLICATIONS

Automatic TV advertisement detection from MPEG bitstream., David A. Sadlier et al., PERGAMON, Oct. 2001, pp. 2719-2726 (Year: 2001).*
(Continued)

*Primary Examiner* — Jayesh A Patel
(74) *Attorney, Agent, or Firm* — McDonnell Boehnen Hulbert & Berghoff LLP

(57) ABSTRACT

The present invention relates to an advertisement detection system based on fingerprints, and provides an advertisement detection systems based on fingerprints, including a content stream storage unit for storing broadcast content in real time, a section selection unit for selecting a reference section and a test section from broadcast content stored by the content stream storage unit, a fingerprint extraction unit for extracting fingerprints from the reference section and the test section selected by the section selection unit using one or more methods, a fingerprint matching unit for comparing the fingerprints from the test section and the reference section, extracted by the fingerprint extraction unit, with each other and then performing matching between the fingerprints, an advertisement section determination unit for determining advertisement segments from the test section based on
(Continued)

results of the matching performed by the fingerprint matching.

20 Claims, 5 Drawing Sheets

Related U.S. Application Data continuation of application No. 15/228,243, filed on Aug. 4, 2016, now Pat. No. 10,104,446, which is a continuation of application No. 14/122,674, filed as application No. PCT/KR2013/005805 on Jul. 1, 2013, now Pat. No. 9,495,598.

(51) Int. Cl.
| H04N 21/234 | (2011.01) |
| H04N 21/8358 | (2011.01) |
| H04N 21/845 | (2011.01) |
| H04N 21/44 | (2011.01) |
| H04H 60/37 | (2008.01) |
| H04N 21/61 | (2011.01) |
| H04H 60/56 | (2008.01) |

(52) U.S. Cl.
CPC . *H04N 21/23418* (2013.01); *H04N 21/44008* (2013.01); *H04N 21/6125* (2013.01); *H04N 21/8358* (2013.01); *H04N 21/845* (2013.01); *H04N 21/8455* (2013.01); *H04H 60/56* (2013.01)

(56) References Cited

U.S. PATENT DOCUMENTS

| 9,495,598 | B2* | 11/2016 | Cho | G06K 9/00718 |
| 10,104,446 | B2* | 10/2018 | Cho | G06K 9/00718 |
| 10,284,922 | B2* | 5/2019 | Cho | G06K 9/00718 |
| 2004/0001160 | A1* | 1/2004 | Herley | H04H 60/37 |
| | | | | 348/465 |
| 2004/0028281 | A1* | 2/2004 | Cheng | G06F 21/10 |
| | | | | 382/232 |
| 2004/0260930 | A1* | 12/2004 | Malik | G06F 21/10 |
| | | | | 713/176 |
| 2005/0066352 | A1* | 3/2005 | Herley | H04N 7/16 |
| | | | | 725/19 |
| 2005/0213826 | A1* | 9/2005 | Neogi | G06K 9/00711 |
| | | | | 382/232 |
| 2007/0055500 | A1* | 3/2007 | Bilobrov | G10L 25/48 |
| | | | | 704/217 |
| 2007/0253594 | A1* | 11/2007 | Lu | G06K 9/00744 |
| | | | | 382/100 |
| 2009/0052784 | A1* | 2/2009 | Covell | G06F 16/783 |
| | | | | 382/209 |
| 2009/0154806 | A1* | 6/2009 | Chang | G06K 9/00758 |
| | | | | 382/173 |
| 2009/0327334 | A1* | 12/2009 | Rodriguez | G06F 21/10 |
| 2010/0061590 | A1* | 3/2010 | Neogi | G06K 9/00711 |
| | | | | 382/100 |
| 2010/0318587 | A1* | 12/2010 | Seet | G06F 16/41 |
| | | | | 707/791 |
| 2014/0196077 | A1* | 7/2014 | Gordon | H04N 21/8358 |
| | | | | 725/31 |

FOREIGN PATENT DOCUMENTS

| KR | 20110129325 | 12/2011 |
| WO | WO2004/004351 | 1/2004 |
| WO | WO2012/091935 | 7/2012 |

OTHER PUBLICATIONS

D.A. Sadlier et al., "Automatic TV advertisement detection from mpeg bitstream," Journal of the Patt. Rec. Society, 35 (2002) 2719-2726.

Examination Report from European Patent Office for European Application No. 13 886 824.5, dated Jul. 28, 2017.

Notification of Reasons for Rejection from Japanese Patent Office for Japanese Application No. 2016-519422, dated Feb. 28, 2017.

International Preliminary Report on Patentability from International Application No. PCT/KR2013/005805, dated Dec. 15, 2015 (translation).

* cited by examiner

ADVERTISEMENT DETECTION SYSTEM AND METHOD BASED ON FINGERPRINTS

RELATED DISCLOSURES

This is a continuation of U.S. patent application Ser. No. 16/133,240, filed Sep. 17, 2018, which is a continuation of U.S. patent application Ser. No. 15/228,243, filed Aug. 4, 2016, and issued as U.S. Pat. No. 10,104,446, which is a continuation of U.S. patent application Ser. No. 14/122,674, filed Nov. 26, 2013, and issued as U.S. Pat. No. 9,495,598, which is a national phase entry of, and claims priority to, International Patent Application No. PCT/KR2013/005805 filed Jul. 1, 2013, based on Korean Patent Application No. 10-2013-0068305, dated Jun. 14, 2013.

TECHNICAL FIELD

The present invention relates, in general, to an advertisement detection system and method and, more particularly, to a system and method that can detect advertisements contained in broadcast content based on fingerprints.

BACKGROUND ART

Television (TV) broadcast content may be divided into a TV program section and an advertisement section. Generally, an advertisement section is recognized as a section having low importance or as an unnecessary section from the standpoint of viewers, so that research into technology for automatically detecting such an advertisement section and eliminating the detected advertisement section or reprocessing the detected advertisement section in another form, and then providing the TV content to users has been widely conducted.

Meanwhile, the necessity to run a related business for TV advertisements or to continuously monitor the advertisements of competitors is also present. Therefore, if a program section and an advertisement section can be automatically distinguished from each other regardless of whether the program section or the advertisement section is important, great convenience may be provided.

However, distinguishing between a program section and an advertisement section in broadcast content was manually performed by a person in most cases in the past, and research into technology for automatically distinguishing between a program section and an advertisement section has been conducted, but there is the limitation that efficiency is still very low.

Conventional known methods of detecting an advertisement section include, for example, a method of detecting an advertisement section by detecting black frames because there are many cases where black frames are inserted into start and end time points of advertisements.

Alternatively, as described in the following Prior Art Document 2, a method of utilizing a principle by which audio signals are not present at time points at which advertisements are changed is also known.

Further, a method of utilizing a principle by which the lengths of advertisements are as uniform as 15 seconds or 30 seconds, or a principle by which the same advertisement repeatedly appears in a broadcast, or a method of detecting a broadcast logo continuously appearing in a TV program section, has also been used, and various methods mentioned above have also been combined to detect an advertisement section.

However, since there are many cases where the signal characteristics of advertisement sections are different for respective countries and broadcasting channels, it is difficult to solve all differences using the above-mentioned conventional methods. For example, in the U.S., there are many cases where black frames are inserted into the start and end positions of advertisements, but this is not the case in other countries.

Further, existing advertisements are arranged into a database (DB) which may be occasionally used to detect an advertisement section, but there is a limitation in that it is very difficult to previously construct a DB storing all advertisements.

Meanwhile, Korean Patent Application Publication No. 10-2011-0129325 (Date of Publication: Dec. 1, 2011) relates to an "Advertisement image detection method and apparatus" and discloses an advertisement image detection method including the step of partitioning each of a plurality of frames of a monitoring target image, in which broadcast content and an advertisement image played by a video play device are mixed, into sub-blocks having a predetermined size; the step of calculating pieces of feature information of respective sub-blocks corresponding to preset locations among the sub-blocks having the predetermined size; the step of converting the pieces of feature information into feature information vectors; and the step of comparing the feature information vectors with the feature information vectors of a reference advertisement image desired to be detected and previously stored in a DB and detecting the reference advertisement image.

However, this technology has a limitation in that pieces of feature information about advertisement images must be previously and accurately stored, and the technology can be applied only to a case where the pieces of feature information of a monitoring target image and an advertisement image are completely identical to each other, and cannot be applied to a case where advertisement sections are only partially identical. Furthermore, this technology is fundamentally limited in that a DB is fixed and then the DB cannot be dynamically updated with the lapse of time.

PRIOR ART DOCUMENTS

1. Korean Patent Application Publication No. 10-2011-0129325 (Date of Publication: Dec. 1, 2011)
2. D. A. Sadlier et al., "Automatic TV advertisement detection from mpeg bitstream," Journal of the Patt. Rec. Society, vol. 35, no. 12, pp. 215, December 2002.

DISCLOSURE

Technical Problem

The present invention has been made keeping in mind the above problems, and an object of the present invention is to provide an advertisement detection system and method, which can accurately and effectively detect advertisement sections by repeating a procedure for detecting advertisement sections continuously appearing in broadcast content and arranging the advertisement sections into a DB.

Another object of the present invention is to provide a system and method, which can continuously store broadcast content in real time, select a reference section and a test section from the stored broadcast content, detect advertisement sections, and change the reference section and the test section based on the results of the detection, thus efficiently selecting the comparison target section of broadcast content that is continuously received, and dynamically coping with the broadcast content.

A further object of the present invention is to provide a system and method, which can more accurately and effectively detect advertisements by detecting repeated advertisement sections based on fingerprints, partitioning each detected advertisement section into segments, storing the segments in a DB, and dividing each stored segment into sub-divided advertisement sections.

Technical Solution

In order to accomplish the above objects, the present invention provides an advertisement detection system based on fingerprints, including a content stream storage unit for storing broadcast content in real time; a section selection unit for selecting a reference section and a test section from broadcast content stored by the content stream storage unit; a fingerprint extraction unit for extracting fingerprints from the reference section and the test section selected by the section selection unit using one or more methods; a fingerprint matching unit for comparing the fingerprints from the test section and the reference section, extracted by the fingerprint extraction unit, with each other and then performing matching between the fingerprints; an advertisement section determination unit for determining advertisement segments from the test section based on results of the matching performed by the fingerprint matching unit; an advertisement DB management unit for storing segment information about the advertisement segments determined by the advertisement section determination unit in an advertisement database (DB) and managing the advertisement DB; and a section update unit for changing the reference section and the test section selected by the section selection unit.

In this case, the section partitioning unit may select a predetermined time section, ranging from a most recent storage time point, as the test section from the broadcast content stored by the content stream storage unit, and select a predetermined time section, ranging from an end point of the test section, as the reference section.

Further, the test section may have a time length shorter than that of the reference section.

Furthermore, the fingerprint extraction unit may partition each of the reference section and the test section into unit sections having a preset time length and extract a fingerprint from each unit section using any one of fingerprint extraction methods, and the fingerprint matching unit may perform a procedure for comparing a fingerprint, extracted from each unit section of the test section, with fingerprints, extracted from all unit sections of the reference section, on all unit sections of the test section, thus performing matching between fingerprints.

Furthermore, start points of the unit sections are spaced apart from each other by a time length (S).

Preferably, the time length (S) between the start points of the unit sections may be shorter than the time length of each unit section.

Furthermore, the advertisement section determination unit determines continuous unit sections of the test section, which match unit sections of the reference section, to be the advertisement segments based on the results of the matching performed by the fingerprint matching unit.

Furthermore, the fingerprint extraction unit may respectively partition each advertisement segment and a section corresponding to the advertisement segment in the reference section into unit sections having a preset time length, and extract fingerprints from the respective unit sections using one or more methods other than the method of extracting fingerprints from the reference section and the test section, and the fingerprint matching unit may perform a procedure for comparing a fingerprint extracted from each unit section of the advertisement segment with fingerprints extracted from all unit sections corresponding to the advertisement segment in the reference section, on all unit sections of the advertisement segment, thus performing fingerprint matching.

Furthermore, the advertisement section determination unit may finally determine continuous unit sections of the advertisement segment, which match unit sections corresponding to the advertisement segment in the reference section, to be the advertisement segments based on the results of the matching performed by the fingerprint matching unit.

Furthermore, the advertisement section determination unit may compare fingerprints of the advertisement segments with fingerprints of advertisement segments previously registered in the advertisement DB, and finally determine the advertisement segments.

Furthermore, the fingerprints may be extracted using one or more methods other than a method of extracting fingerprints from the reference section and the test section.

Furthermore, the advertisement DB management unit may store one or more fingerprints from the advertisement segments determined by the advertisement section determination unit and pieces of time information about the advertisement segments as segment information in the advertisement DB.

Furthermore, the section update unit may change the reference section by causing an interval ranging to an end point of each advertisement segment determined from the test section to be included in the reference section.

Furthermore, when there are a plurality of advertisement segments, the reference section may be changed by causing an interval ranging to an end point of a last advertisement segment to be included in the reference section.

Furthermore, an overall length of the reference section may be uniformly maintained by changing a position of a start point of the reference section by a length newly included in the reference section.

Furthermore, the section update unit may extend a length of the test section by a length by which the position of the start point of the reference section is changed.

Furthermore, the section update unit may change the reference section by causing an interval ranging to a position previous to a start point of each advertisement segment determined from the test section to be included in the reference section.

Furthermore, when there are a plurality of advertisement segments, the reference section is changed by causing an interval ranging to a position previous to a start point of an initial advertisement segment to be included in the reference section.

Furthermore, an overall length of the reference section may be uniformly maintained by changing a position of a start point of the reference section by a length newly included in the reference section.

Furthermore, the section update unit may be configured to store pieces of time information about start points of reference sections corresponding to the advertisement segments determined by the advertisement section determination unit in advertisement segment history, and be configured to, whenever a predetermined period of time has elapsed, check a preset search section for the advertisement segment history, and remove sections corresponding to a time point previous to a minimum value of pieces of time information included in the search section from the reference section.

Furthermore, the advertisement DB management unit may select two of advertisement segments stored in the advertisement DB, compare fingerprints of the selected advertisement segments with each other, detects an identical section, and separates the identical section and remaining sections of the selected advertisement segments, thus performing a new advertisement segment formation procedure.

Furthermore, advertisement segments, existing before separation is performed, may be removed from the advertisement DB.

Furthermore, the new advertisement segment formation procedure may be repeatedly performed on any two advertisement segments a preset number of times (N).

Furthermore, the new advertisement segment formation procedure may be performed on two segments, time lengths of which are equal to or greater than a predetermined time length (K).

Furthermore, the new advertisement segment formation procedure may be repeatedly performed until advertisement segments having an identical section are not present any longer in any advertisement segments included in the advertisement DB.

Furthermore, the advertisement DB management unit may update fingerprints and time information of the newly formed advertisement segments.

In accordance with another aspect of the present invention, there can be provided as an advertisement detection method based on fingerprints, including a first step of storing broadcast content in real time; a second step of selecting a reference section and a test section from the stored broadcast content; a third step of extracting fingerprints from the reference section and the test section using one or more methods; a fourth step of comparing fingerprints extracted from the test section with fingerprints extracted from the reference section and then performing matching between fingerprints; a fifth step of determining advertisement segments from the test section based on results of the matching; a sixth step of storing segment information about the determined advertisement segments in an advertisement database (DB); and a seventh step of changing the reference section and the test section.

Advantageous Effects

In accordance with the present invention, there can be provided an advertisement detection system and method, which can accurately and effectively detect advertisement sections by repeating a procedure for detecting advertisement sections continuously appearing in broadcast content and arranging the advertisement sections into a DB.

Further, the present invention is advantageous in that it can provide a system and method, which can continuously store broadcast content in real time, select a reference section and a test section from the stored broadcast content, detect advertisement sections, and change the reference section and the test section based on the results of the detection, thus efficiently selecting the comparison target section of broadcast content that is continuously received, and dynamically coping with the broadcast content.

Furthermore, the present invention can provide a system and method, which can more accurately and effectively detect advertisements by detecting repeated advertisement sections based on fingerprints, partitioning each detected advertisement section into segments, storing the segments in a DB, and dividing each stored segment into sub-divided advertisement sections.

BEST MODE

Hereinafter, embodiments of the present invention will be described in detail with reference to the attached drawings.

Figure 1:
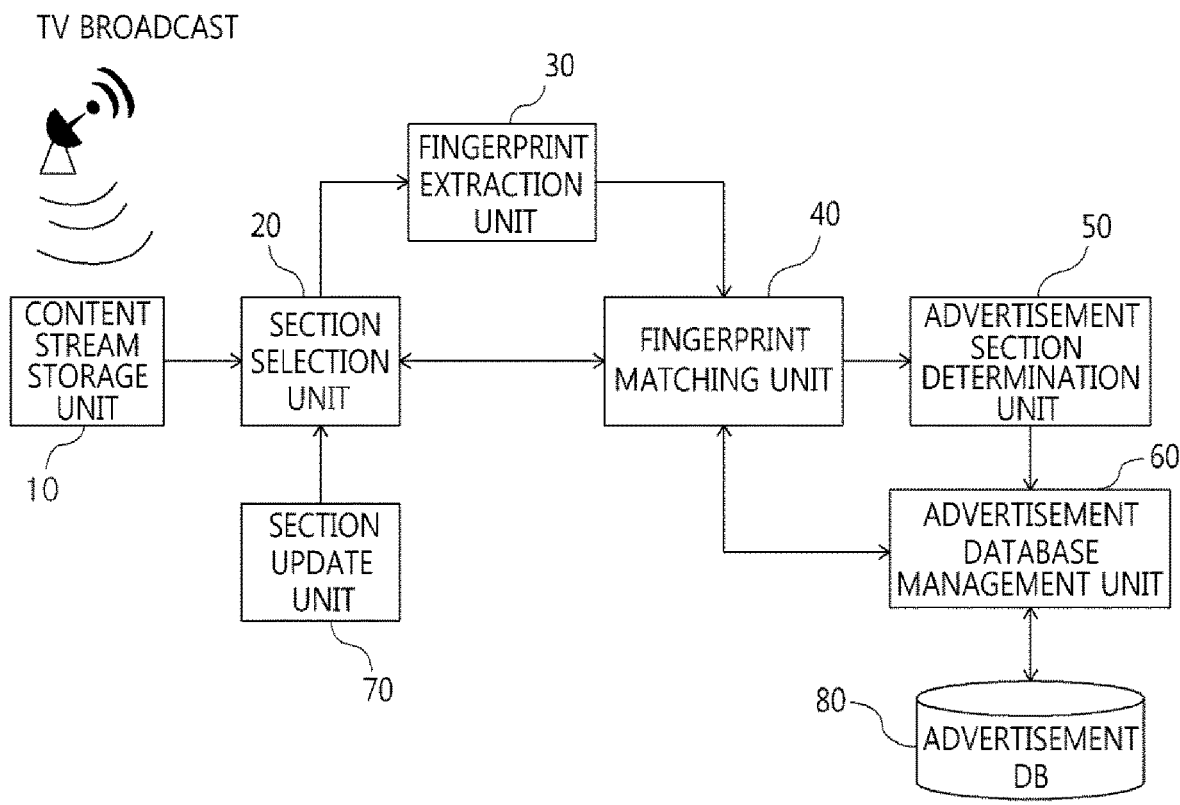
FIG. 1 is a diagram showing the overall configuration of an advertisement detection system 100 based on fingerprints according to an embodiment of the present invention.

FIG. 1 is a diagram showing the overall configuration of an advertisement detection system 100 based on fingerprints according to an embodiment of the present invention. Referring to FIG. 1, the advertisement detection system 100 based on fingerprints (hereinafter referred to as "advertisement detection system 100") according to the present embodiment includes a content stream storage unit 10, a section selection unit 20, a fingerprint extraction unit 30, a fingerprint matching unit 40, an advertisement section determination unit 50, an advertisement database (DB) management unit 60, a section update unit 70, and an advertisement DB 80.

The content stream storage unit 10 functions to store broadcast content in real time. The broadcast content may be content provided via, for example, TV terrestrial broadcasting or cable television. The content stream storage unit 10 may store such broadcast content in real time or continuously.

The section selection unit 20 performs the function of selecting a reference section and a test section from the broadcast content stored by the content stream storage unit 10.

The test section is a section required to identify whether an advertisement is contained, and the reference section is a section that is a comparison target making it possible to identify whether an advertisement is contained in the test section.

The section selection unit 20 may select, as the test section, a predetermined time section ranging from the most recent storage time point from the broadcast content stored by the content stream storage unit 10, and may select, as the reference section, a predetermined time section ranging from the end point of the test section.

Figure 2:
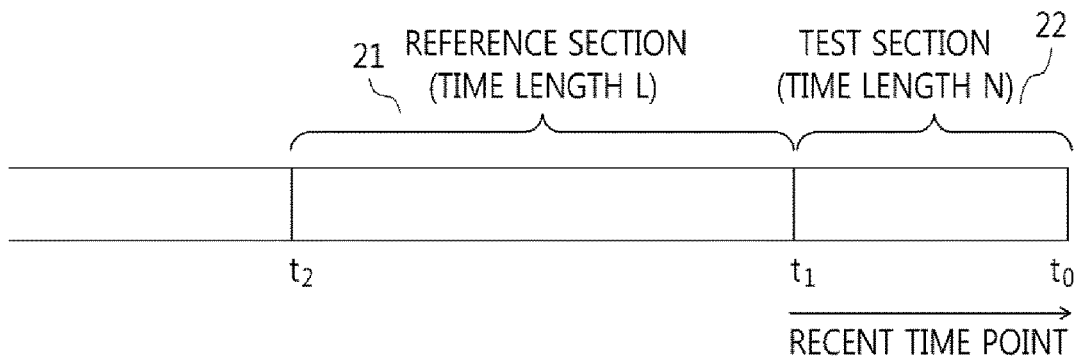
FIG. 2 is a diagram showing an example of a method of selecting a reference section and a test section using a section selection unit 20.

FIG. 2 is a diagram showing an example of a method of selecting a reference section and a test section using the section selection unit 20.

As shown in FIG. 2, if it is assumed that, based on the time of stored broadcast content, the rightmost position is the most recent time point $t_0$, an interval ranging from the rightmost time point, that is, the most recent storage time point $t_0$, to time point $t_1$ by a predetermined time length N, may be selected as the test section 22. Further, an interval ranging from the end point $t_1$ of the test section 22 to time point $t_2$ by a predetermined time length L may be selected as the reference section 21.

In this case, it is preferable that the time length of the test section 22 be shorter than that of the reference section 21, in other words, the time length of the reference section 21 be longer than that of the test section 21. The reason for this is that the detection of an advertisement contained in the test section 22 is performed to have higher discrimination as the reference section 21 becomes longer. For example, a section having a length of 10 hours may be selected as the test section 22, and a section having a length of three days may be selected as the reference section 21.

Referring back to FIG. 1, the fingerprint extraction unit 30 functions to extract fingerprints from the reference section and the test section selected by the section selection unit 20 using one or more methods, and the fingerprint matching unit 40 performs matching between fingerprints by comparing the fingerprints extracted from the test section by the fingerprint extraction unit 30 with the fingerprints extracted from the reference section. Meanwhile, the advertisement section determination unit 50 functions to determine advertisement segments from the test section based on the results of the matching performed by the fingerprint matching unit 40.

That is, the fingerprint extraction unit 30 partitions each of the reference section and the test section into unit sections having a preset time length, and extracts a fingerprint from each unit section using any one of fingerprint extraction methods. The fingerprint matching unit 40 performs matching between fingerprints by performing a procedure for comparing a fingerprint extracted from each unit section of the test section with fingerprints extracted from all unit sections of the reference section, on all unit sections of the test section. Further, the advertisement section determination unit 50 determines advertisement segments from the test section based on the results of the matching.

Figure 3:
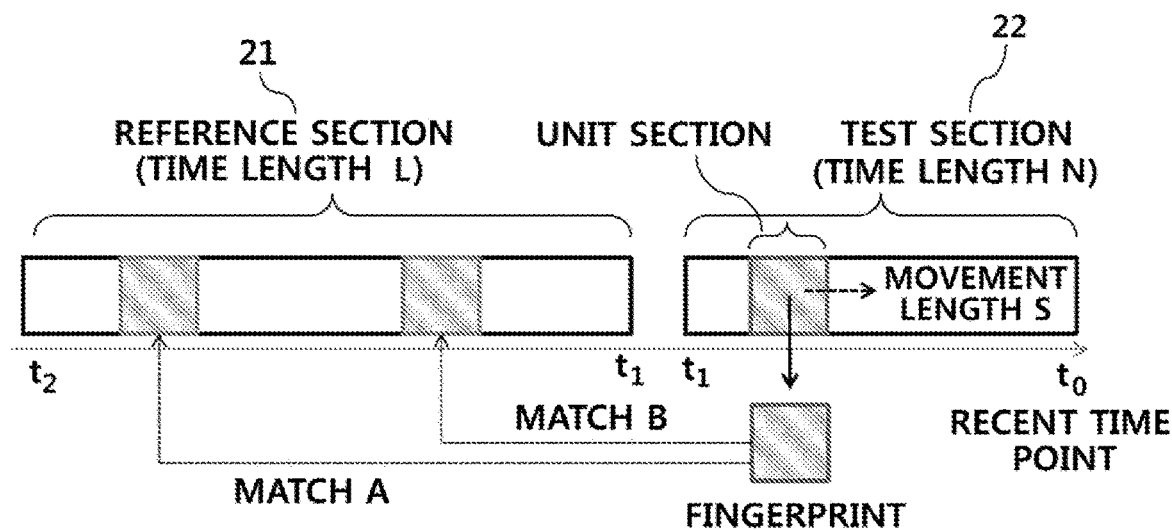
FIG. 3 is a diagram showing the operation of a fingerprint extraction unit 30 and a fingerprint matching unit 40.

FIG. 3 is a diagram showing the operation of the fingerprint extraction unit 30 and the fingerprint matching unit 40.

As shown in FIG. 3, in the test section 22, a unit section ranging from time point $t_1$ by a preset time length is generated. Further, even in the reference section 21, a unit section ranging from time point $t_2$ by a time length corresponding to that of the unit section of the test section 22 is generated. The fingerprint extraction unit 30 extracts fingerprints from the two unit sections, and the fingerprint matching unit 40 performs matching between the extracted fingerprints.

The fingerprint matching unit 40 temporarily stores the results of the matching, for example, a matching score, generates a subsequent unit section of the reference section 21, and then performs matching between fingerprints. In this case, the start point of the subsequent unit section is preferably spaced apart from the start point of the previously generated unit section by a movement length S shorter than the time length of the unit section on a time axis. That is, individual unit sections preferably have overlapping portions with each other on the time axis.

When this procedure is performed on all sections to the end point $t_1$ of the reference section 21, matching between fingerprints for one unit section generated in the test section 22 is completed.

If the extraction and matching of fingerprints from all unit sections of the reference section 21 have been completed on the first unit section of the test section 22, a subsequent unit section of the test section 22 is generated, and the above procedure is repeated. In this case, the start point of the subsequent unit section of the test section 22 is also preferably spaced apart from the start point of the previous unit section by a time length shorter than the time length of the unit section.

The interval between the start points of the unit sections of the test section 22 and the interval between the start points of the unit sections of the reference section 21 may be identical to or different from each other.

If this procedure has been repeatedly performed even on the last unit section of the test section 22, the results of the matching of fingerprints of the reference section 21 with the fingerprints of the respective unit sections of the test section 22 may be obtained. The advertisement section determination unit 50 determines whether matching has been performed based on the results of the matching of fingerprints with the respective unit sections, that is, a fingerprint matching score, determines continuous sections in matched unit sections, and determines the continuous unit sections to be advertisement segments.

Figure 4:
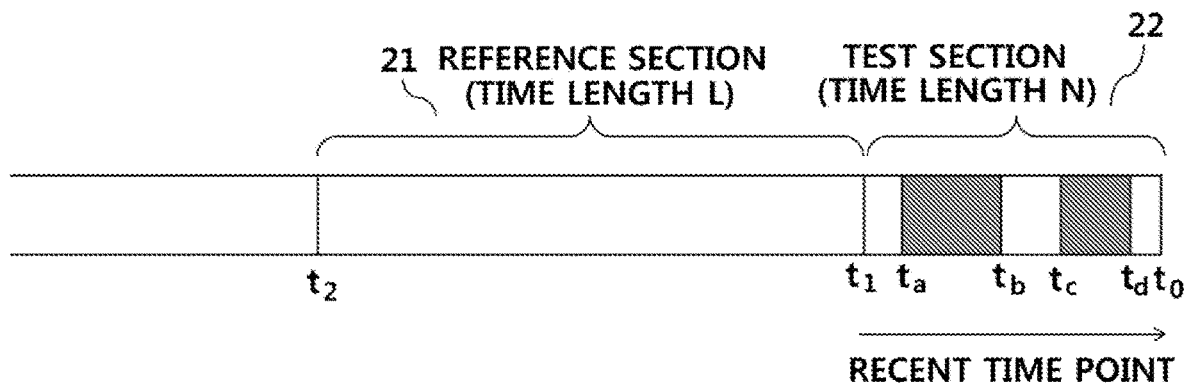
FIG. 4 is a diagram showing a procedure for determining advertisement segments from a test section 22.

FIG. 4 is a diagram showing a procedure for determining advertisement segments from the test section 22.

In the test section 22 on the right side of FIG. 4, portions indicated in blue indicate continuous sections in which matching of fingerprints with the reference section 21 is achieved, and it can be seen that two continuous sections $t_a \sim t_b$ and $t_c \sim t_d$ are determined to be advertisement segments.

Meanwhile, in the present invention, a fingerprint denotes feature data indicative of the features of data, such as audio data, image data, or video data, and is also called fingerprint data, deoxyribonucleic acid (DNA) data, or gene data. Technology for extracting and comparing such fingerprints, various methods are proposed according to the conventional technology. If such fingerprints are utilized, the identicalness of data may be easily determined, and then fingerprints have recently been widely used in Digital Rights Management (DRM) fields or the like.

For example, in the case of audio data, fingerprints may be generated using various types of feature data (e.g., frequency, amplitude, etc.) indicative of the features of audio data, and in the case of image or video data, fingerprints may be generated using various types of feature data related to image or video data (e.g., the motion vector information, color information, etc. of each frame).

An object of the present invention is not a method itself of extracting (generating) such fingerprint data, and any type of conventional fingerprint generation/extraction method can be used without change, and thus a detailed description thereof will be omitted here.

According to Korean Patent Application No. 10-2007-0044251 (entitled "Method and apparatus for generating audio fingerprint data and method and apparatus for comparing audio data using the same"), Korean Patent Application No. 10-2007-0054601 (entitled "Method and apparatus for determining identicalness of video data and detecting an identical section"), Korean Patent Application No. 10-2007-0060978 (entitled "Method and system for clustering pieces of video data having identicalness among pieces of video data"), Korean Patent Application No.

10-2007-0071633 (entitled "Method and apparatus for providing a video data search service using video data clusters"), Korean Patent Application No. 10-2007-0091587 (entitled "Method and apparatus for setting and providing advertisement data using video data clusters"), and Korean Patent Application No. 10-2008-0051688 (entitled "Video processing method and apparatus"), which are filed by the present applicant, methods of generating fingerprints of audio, image or video data and comparing pieces of data using such fingerprints are described, and it is apparent that the fingerprint extraction methods by the present applicant may also be used in the present invention. In summary, the present invention may use fingerprint extraction technology known to the prior art without change, regardless of which type of fingerprint extraction method is to be used.

In this way, methods of extracting fingerprints may be implemented using various methods. As described above, the present invention may also be configured such that, if advertisement segments have been determined by the advertisement section determination unit 50, fingerprints are extracted from the advertisement segments using another fingerprint extraction method and then secondary matching is performed by comparing the extracted fingerprints with those of the reference section.

That is, with respect to each advertisement segment determined by the advertisement section determination unit 50, the fingerprint extraction unit 30 may respectively partition the advertisement segment and a section corresponding to the advertisement segment in the reference section into unit sections having a preset time length, and extract fingerprints from the respective unit sections using one or more methods other than the method of extracting fingerprints from the reference section and the test section. Further, the fingerprint matching unit 40 may perform fingerprint matching by performing a procedure for comparing a fingerprint extracted from each unit section of the advertisement segment with fingerprints extracted from all unit sections corresponding to the advertisement segment in the reference section on all unit sections of the advertisement segment.

After this procedure has been performed, the advertisement section determination unit 50 may finally determine the continuous unit sections of the advertisement segment, which match the unit sections corresponding to the advertisement segment in the reference section, as the advertisement segment, based on the results of the matching performed by the fingerprint matching unit 40.

Meanwhile, the advertisement section determination unit 50 may also be configured to compare the fingerprints of the section determined to be the advertisement segment with the fingerprints of advertisement segments previously registered in the advertisement DB 80, and to finally determine the corresponding advertisement segment as the advertisement segment when the fingerprints match each other. Preferably, the fingerprints at this time may be fingerprints obtained using one or more methods other than the method of extracting fingerprints from the reference section and the test section in the above procedure.

Referring back to FIG. 1, the advertisement DB management unit 60 and the section update unit 70 will be described below.

The advertisement DB management unit 60 functions to store segment information about the advertisement segments determined by the advertisement section determination unit in the advertisement DB 80 and manage the advertisement DB 80.

Figure 5:
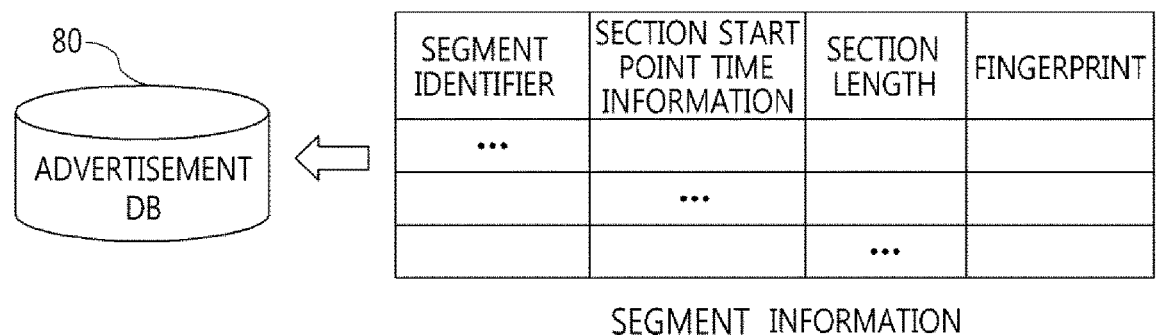
FIG. 5 is a diagram showing an example of segment information stored in an advertisement database 80.

FIG. 5 is a diagram showing an example of segment information stored in the advertisement DB 80.

Referring to FIG. 5, segment information includes a segment identifier, section start point time information, a section length, and a fingerprint.

The segment identifier denotes an identifier (ID) uniquely assigned to each advertisement segment so that the advertisement segment can be identified, and the section start point time information may be stored in the form of, for example, 11:59:35 on May 20, 2013 (2013-05-20/11:59:35). The section length denotes the overall section length of the advertisement segment and may be stored in the form of, for example, 30 seconds or 20 seconds.

The fingerprint denotes a fingerprint extracted by the fingerprint extraction unit 30, as described above. As described above, fingerprint extraction methods in the present invention may be implemented using various types of methods, and thus fingerprints stored in segment information may also be fingerprints based on respective methods, which are extracted using various types of methods.

The section update unit 70 functions to change the reference section and the test section selected by the section selection unit 20.

The section update unit 70 may change the reference section so that the advertisement segment determined from the test section by the advertisement section determination unit 50 is included in the reference section, in other words, so that an interval ranging to the end point of the advertisement segment determined from the test section is included in the reference section. For example, as shown in FIG. 4, the reference section may be changed such that an interval ranging to the end point $t_b$ of the advertisement segment having a time section $t_a$~$t_b$, that is, an interval $t_1$~$t_b$, is included in the reference section.

Meanwhile, when there are a plurality of advertisement segments, the reference section may be changed so that an interval ranging to the end point of the last advertisement segment (in the case of FIG. 4, time $t_d$) is included in the reference section.

When the reference section is changed in this way, the overall length of the reference section may be uniformly maintained by changing the position of the start point of the reference section by a length newly included in the reference section. For example, as shown in FIG. 4, since the reference section has a length corresponding to time length L, the overall time length of the reference section may be uniformly maintained at L by removing part of the reference section by an interval $t_1$~$t_d$ from time $t_2$ to the right when the interval $t_1$~$t_d$ is newly included in the reference section.

In this manner, when the position of the start point of the reference section is changed, the start point of the test section is shifted in proportion to such a change, and thus the end point of the test section may be shifted by the length by which the position of the start point of the reference section is changed.

When the test section and the reference section are changed by the section update unit 70 in this manner, the procedure for matching fingerprints between the test section and the reference section and determining an advertisement section via the fingerprint extraction unit 30, the fingerprint matching unit 40, and the advertisement section determination unit 50 may be repeated.

Figure 6:
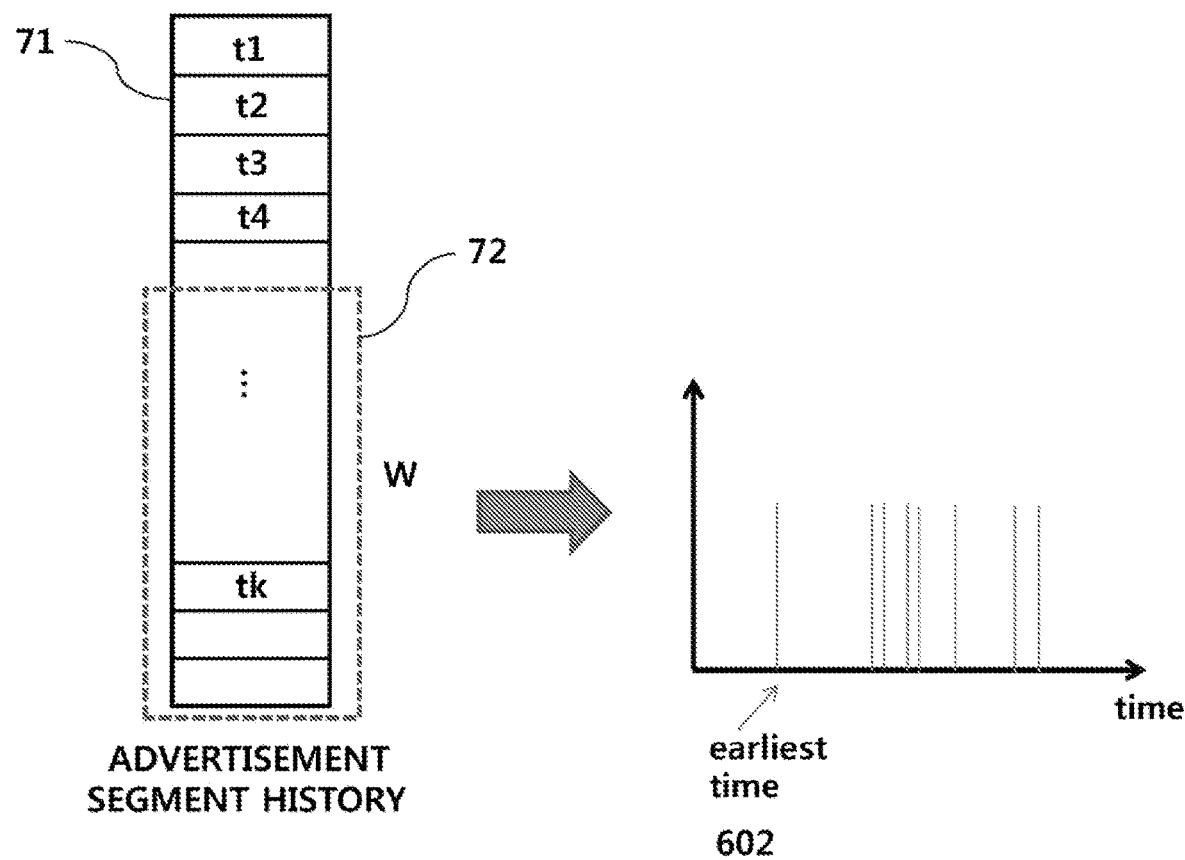
FIG. 6 is a diagram showing an example of a method of changing a reference section using a section update unit 70.

Meanwhile, the section update unit 70 may also change a reference section using a method shown in FIG. 6. FIG. 6 is a diagram showing an example in which the section update unit 70 changes a reference section.

The section update unit 70 stores pieces of time information about the start points of reference segments corresponding to the advertisement segments determined by the advertisement section determination unit 50 in advertisement segment history 7 sequentially from above whenever the advertisement segment is determined, as shown in FIG. 6. Whenever a predetermined period of time has elapsed, the section update unit 70 determines a minimum value from among pieces of time information stored in the search section for the advertisement segment history having a preset length W from the bottom of the advertisement segment history, that is, the most recent storage time information, and may remove sections corresponding to time points previous to the minimum value from the reference sections. The reason for this is that the sections corresponding to the time points previous to the minimum value correspond to reference sections in which advertisements scarcely occur for a predetermined period of time, and then these reference sections are intended to be removed from reference sections.

Meanwhile, if the advertisement segments are determined via the above-described procedure, and pieces of segment information about the advertisement segments are stored in the advertisement DB 80, as shown in FIG. 5, the advertisement DB management unit 60 may partition each stored advertisement segment into advertisement segments which are smaller units. The reason for this is that, for example, even in the case of advertisements for the same product, pieces of time information may be configured to be differently set and edited.

Figure 7:
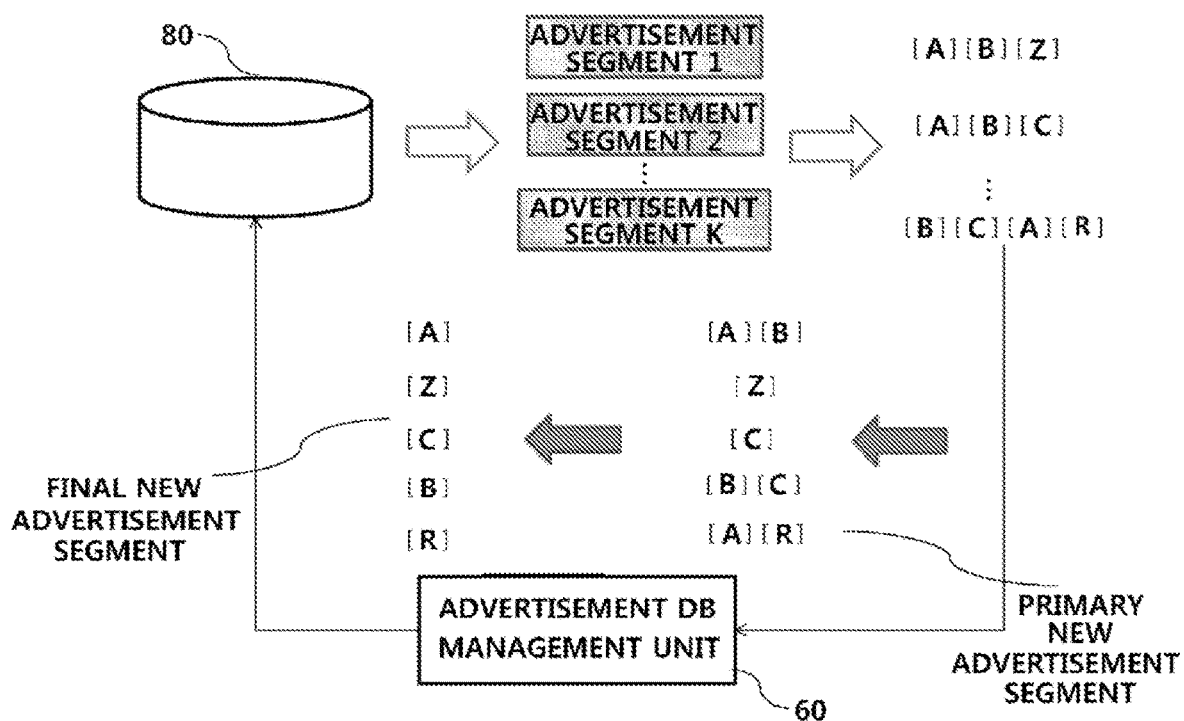
FIG. 7 is a diagram showing a procedure for partitioning an advertisement segment into advertisement segments which are smaller units and forming new advertisement segments using an advertisement DB management unit 60.

FIG. 7 is a diagram showing a procedure in which the advertisement DB management unit 60 partitions an advertisement segment into advertisement segments which are smaller units and generates new advertisement segments.

Referring to FIG. 7, it is assumed that K advertisement segments are present, advertisement segment 1 is composed of [A][B][Z], advertisement segment 2 is composed of [A][B][C], and advertisement segment K is composed of [B][C][A][R]. Here, the same letter denotes the same section.

In this state, any two of advertisement segments are selected, fingerprints of the selected advertisement segments are compared with each other, and the same sections are detected. Thereafter, the same sections and the remaining sections of the selected advertisement segments are separated, and then new advertisement segments may be formed.

For example, when the advertisement segment 1 composed of [A][B][Z] and the advertisement segment 2 composed of [A][B][C] are compared with each other, the same sections [A][B] may be detected, and new advertisement segments may be formed by separating the detected same sections and the remaining sections ([Z], [C]). If two of the advertisement segments are selected and the above procedure is repeatedly performed on the selected advertisement segments, new advertisement segments shown as 'primary new advertisement segments' in FIG. 7 may be formed. Next, if the same procedure is also repeatedly performed on the new advertisement segments, the final new advertisement segments may be formed, as shown in FIG. 7.

Figure 8:
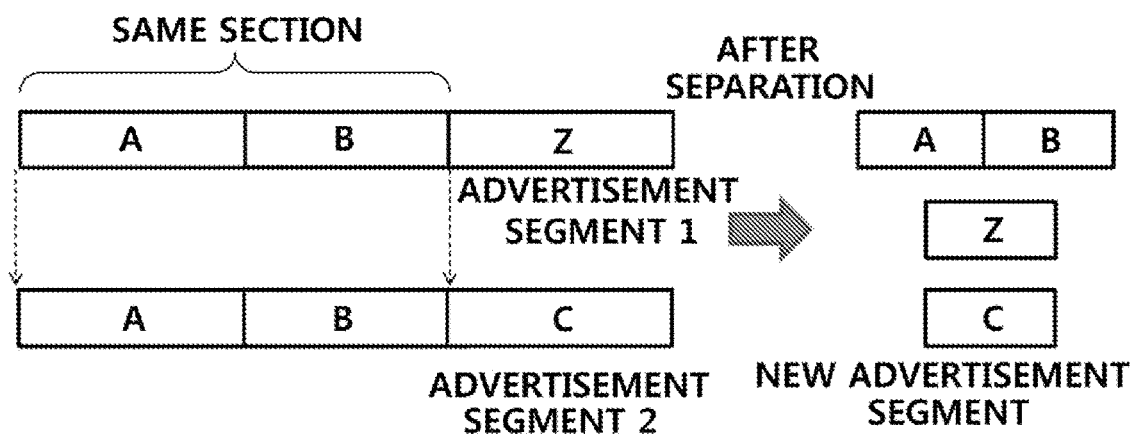
FIGS. 8 and 9 are diagrams showing a procedure for partitioning advertisement segments.
Figure 9:
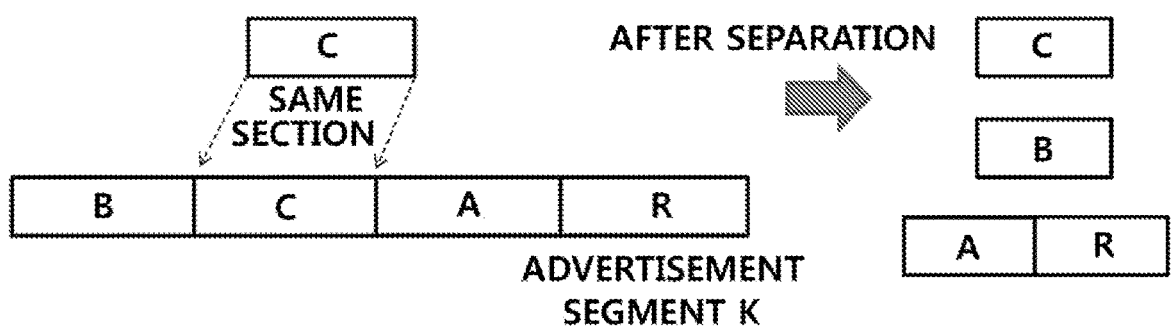

FIGS. 8 and 9 are diagrams showing a procedure for partitioning advertisement segments.

FIG. 8 is a diagram showing a procedure for comparing the advertisement segments 1 and 2 of FIG. 7 with each other and detecting the same section. As shown in FIG. 8, the same sections are [A][B], which may be detected using a procedure for extracting and comparing fingerprints, as described above in FIGS. 1 to 6.

Once the same sections have been detected, if the same sections and the remaining sections, that is, non-identical sections, are separated from the original advertisement segments 1 and 2, new advertisement segments respectively implemented using [A][B], [Z], and [C] are formed, as shown on the right side of FIG. 8.

The advertisement segments existing before separation, that is, the advertisement segments 1 and 2, are removed from the advertisement DB as the new advertisement segments are formed.

FIG. 9 is a diagram showing a procedure for comparing the advertisement segment K of FIG. 7 with the advertisement segment implemented using [C] of the new advertisement segments, newly generated in FIG. 8, with each other, and detecting the same section. Referring to FIG. 9, if the same section is [C] and is separated, it can be seen that two new advertisement segments respectively implemented using [A][R] on the right side and [B] on the left side may be formed. Thereafter, the existing advertisement segment K is removed from the advertisement DB 80.

When this procedure is repeatedly performed on advertisement segments stored in the advertisement DB 80, the final new advertisement segments may be obtained, as shown in FIG. 7.

In this case, the procedure for forming new advertisement segments may be repeatedly performed on any two advertisement segments a preset number of times (N).

Further, this procedure may be performed only on two segments, the time lengths of which are equal to or greater than a predetermined time length K.

Furthermore, the procedure for forming new advertisement segments may be repeatedly performed until advertisement segments having the same section are not present any longer in any advertisement segments included in the advertisement DB.

Meanwhile, if new advertisement segments are finally formed via the above-described procedure, the advertisement DB management unit 70 updates segment information about the new advertisement segments, that is, fingerprints and time information (see FIG. 5) in correspondence with the new advertisement segments.

Figure 10:
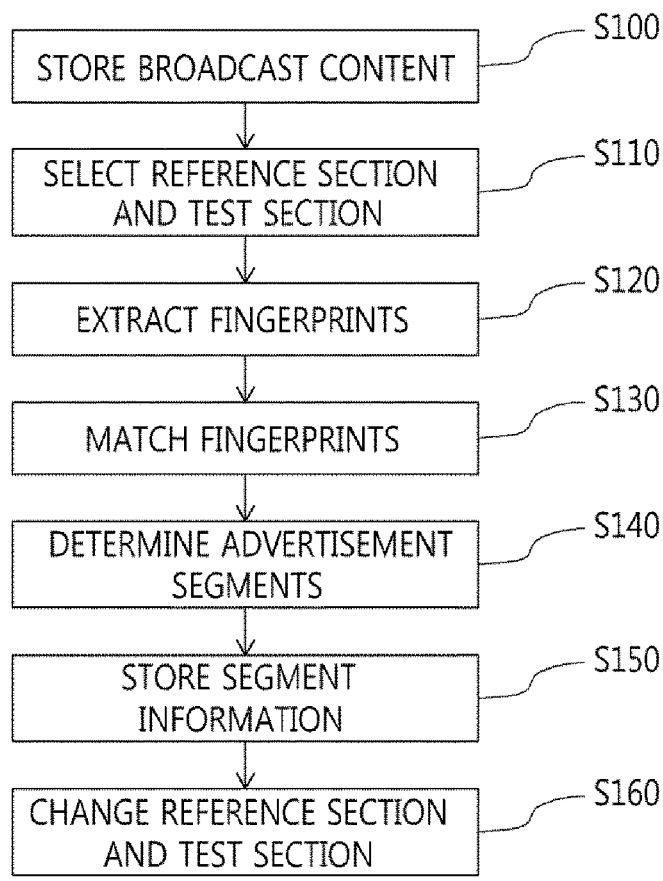
FIG. 10 is a diagram showing an embodiment of an advertisement detection method according to the present invention.

FIG. 10 is a diagram showing an embodiment of an advertisement detection method performed by the advertisement detection system 100 described with reference to FIGS. 1 to 9.

First, the content stream storage unit 10 stores broadcast content in real time (S100), and the section selection unit 20 selects a reference section and a test section from the broadcast content stored by the content stream storage unit 10 (S110).

The fingerprint extraction unit 30 extracts fingerprints from the reference section and the test section selected by the section selection unit 20 using one or more methods (S120), and the fingerprint matching unit 40 compares the fingerprint extracted from the test section by the fingerprint extraction unit 30 with the fingerprint extracted from the reference section and performs matching between the fingerprints (S130).

The advertisement section determination unit 50 determines advertisement segments from the test section based on the results of the matching by the fingerprint matching unit 40 (S140), and the advertisement DB management unit 60 stores the segment information about the advertisement segments determined by the advertisement section determination unit 50 in the advertisement DB 80 (S150).

Next, either at regular intervals or when a predetermined condition occurs, the section update unit 70 changes the reference section and the test section selected by the section selection unit 20 (S160).

Although the preferred embodiments of the present invention have been disclosed with reference to the preferred embodiments, those skilled in the art will appreciate that the present invention is not limited to the above embodiments and various changes and modifications are possible.

The invention claimed is:

1. A method for advertisement detection based on fingerprints, the method comprising:
   storing a sequence of broadcast content in real time;
   selecting a reference section and a test section from the stored sequence of broadcast content, wherein the selected test section and the selected reference section are respective time sections defined in relation to each other in the stored sequence of broadcast content, and wherein selecting the reference section and the test section from the stored sequence of broadcast content comprises selecting from the stored sequence of broadcast content a first time section as the test section and selecting from the same stored sequence of broadcast content a second time section, ranging from an end point of the test section, as the reference section;
   generating fingerprints respectively from the selected reference section and from the selected test section, using one or more fingerprint generation methods;
   comparing the generated fingerprints from the test section with the generated fingerprints from the reference section to perform matching between the compared fingerprints;
   determining advertisement segments from the test section based on results of the matching; and
   storing segment information about the determined advertisement segments in an advertisement database.

2. The method of claim 1, wherein the broadcast content comprises television (TV) content.

3. The method of claim 2, wherein the fingerprints comprise audio fingerprints.

4. The method of claim 2, wherein the fingerprints comprise video fingerprints.

5. The method of claim 1, wherein selecting the first time section as the test section comprises selecting as the first time section a time section ranging from a most recent storage point of the stored sequence of broadcast content.

6. The method of claim 1,
   wherein generating fingerprints respectively from the selected reference section and from the selected test section comprises partitioning each of the reference section and the test section into unit sections having a preset time length, and generating a fingerprint from each unit section, and
   wherein comparing the generated fingerprints from the test section with the generated fingerprints from the reference section comprises, for each unit section of the test section, comparing a fingerprint generated from the unit section of the test section with fingerprints generated from all unit sections of the reference section.

7. The method claim 6,
   wherein start points of the unit sections are spaced apart from each other by a first time length, and
   wherein the first time length between the start points of the unit sections is shorter than the preset time length of each unit section.

8. The method of claim 6, wherein determining advertisement segments from the test section based on results of the matching comprises determining advertisement segments as continuous unit sections of the test section that match unit sections of the reference section.

9. The method of claim 1, wherein storing segment information about the determined advertisement segments in the advertisement database comprises storing in the advertisement database (i) one or more fingerprints from the determined advertisement segments and (ii) pieces of time information about the advertisement segments.

10. The method of claim 1, wherein the selected test section is a more recent time segment than the selected reference section in the sequence of content.

11. The method of claim 1, further comprising:
    for each advertisement segment, (a) partitioning into respective unit sections having a preset time length both the advertisement segment and a section corresponding to the advertisement segment in the reference section, and generating fingerprints from the respective unit sections, (b) for each respective unit section of the advertisement segment, comparing a fingerprint generated from the respective unit section with fingerprints generated from all respective unit sections corresponding to the advertisement segment in the reference section, and (c) determining continuous respective unit sections of the advertisement segment that match respective unit sections corresponding to the advertisement segment in the reference section, to be the advertisement segment.

12. The method of claim 1, wherein storing segment information about the determined advertisement segments in the advertisement database comprises storing pieces of time information about start points of reference sections corresponding to the determined advertisement segments in advertisement segment history.

13. The method of claim 1, further comprising:
    changing the reference section and the test section.

14. A method for advertisement detection based on fingerprints, the method comprising:
    storing broadcast content in real time, wherein the stored broadcast content defines a sequence of content over time;
    selecting a reference section and a test section from the stored broadcast content, wherein the selected test section and the selected reference section are respective time sections defined in relation to each other in the sequence of content;
    generating fingerprints respectively from the selected reference section and from the selected test section, using one or more fingerprint generation methods;
    comparing the generated fingerprints from the test section with the generated fingerprints from the reference section to perform matching between the compared fingerprints;
    determining advertisement segments from the test section based on results of the matching;
    storing segment information about the determined advertisement segments in a database; and
    for each advertisement segment, (a) partitioning into respective unit sections having a preset time length both the advertisement segment and a section corresponding to the advertisement segment in the reference section, and generating fingerprints from the respective unit sections, (b) for each respective unit section of the advertisement segment, comparing a fingerprint generated from the respective unit section with fingerprints generated from all respective unit sections corresponding to the advertisement segment in the reference section, and (c) determining continuous respective unit sections of the advertisement segment that match respective unit sections corresponding to the advertisement segment in the reference section, to be the advertisement segment.

15. The method of claim 14, wherein the broadcast content comprises television (TV) content.

16. The method of claim 14, wherein the fingerprints comprise audio fingerprints.

17. The method of claim 14, wherein the fingerprints comprise video fingerprints.

18. The method of claim 14, wherein selecting the reference section and the test section from the stored broadcast content comprises selecting a predetermined time section, ranging from a most recent storage time point, as the test section from the broadcast content and selecting a predetermined time section, ranging from an end point of the test section, as the reference section.

19. The method of claim 14, wherein storing segment information about the determined advertisement segments in the database comprises storing in the database (i) one or more fingerprints from the determined advertisement segments and (ii) pieces of time information about the advertisement segments.

20. The method of claim 14, wherein the selected test section is a more recent time segment than the selected reference section in the sequence of content.

* * * * *